United States Patent
Rohden

(10) Patent No.: US 8,950,353 B2
(45) Date of Patent: Feb. 10, 2015

(54) SHIP AND GANGWAY FOR THE SAME

(75) Inventor: Rolf Rohden, Aurich (DE)

(73) Assignee: Wobben Properties GmbH, Aurich (DE)

( * ) Notice: Subject to any disclaimer, the term of this patent is extended or adjusted under 35 U.S.C. 154(b) by 107 days.

(21) Appl. No.: 13/823,070

(22) PCT Filed: Aug. 1, 2011

(86) PCT No.: PCT/EP2011/063193
§ 371 (c)(1),
(2), (4) Date: May 21, 2013

(87) PCT Pub. No.: WO2012/034770
PCT Pub. Date: Mar. 22, 2012

(65) Prior Publication Data
US 2013/0228110 A1    Sep. 5, 2013

(30) Foreign Application Priority Data
Sep. 16, 2010   (DE) .......................... 10 2010 040 899

(51) Int. Cl.
*B63B 17/00* (2006.01)
*B63B 27/00* (2006.01)
*B63B 27/14* (2006.01)
*B63H 9/02* (2006.01)

(52) U.S. Cl.
CPC ................ *B63B 27/00* (2013.01); *B63B 27/14* (2013.01); *B63H 9/02* (2013.01); *B63B 2027/141* (2013.01)
USPC ............... 114/362; 14/71.1; 14/71.3; 14/71.7

(58) Field of Classification Search
USPC .................................. 114/362; 14/71.1–71.7
See application file for complete search history.

(56) References Cited

U.S. PATENT DOCUMENTS

| | | | |
|---|---|---|---|
| 1,674,169 A | 6/1928 | Flettner |
| 2,141,181 A | 12/1938 | Geddes |
| 2,713,392 A | 7/1955 | Von Karman et al. |
| 3,616,776 A | 11/1971 | Anker-Nilsen |

(Continued)

FOREIGN PATENT DOCUMENTS

| BE | 895044 | 3/1983 |
|---|---|---|
| CN | 87100987 A | 10/1987 |

(Continued)

OTHER PUBLICATIONS

"Hybrid rotors for wind propulsion," *Marine Engineers Review*, Sep. 1, 1991, London, G.B., pp. 54-55.

(Continued)

*Primary Examiner* — Lars A Olson
*Assistant Examiner* — Jovon Hayes
(74) *Attorney, Agent, or Firm* — Seed IP Law Group PLLC

(57) ABSTRACT

The invention relates to a ship, in particular a freight ship, comprising an outer wall and a gangway for embarking and disembarking the ship, which can be moved backwards and forwards between an embarking/disembarking position and a stored position when the ship is being driven. The invention also relates to a ship in which the gangway comprises a base having a lower surface which, when said gangway is in the stored position, is flush with the surface of the outer wall. The invention also relates to a gangway for embarking and disembarking a ship, which is embodied according to the claimed invention for use on a ship.

17 Claims, 5 Drawing Sheets

(56) References Cited

U.S. PATENT DOCUMENTS

| | | | |
|---|---|---|---|
| 4,168,764 A * | 9/1979 | Walters | 182/1 |
| 4,333,196 A * | 6/1982 | Bougaran | 14/71.7 |
| 4,398,895 A | 8/1983 | Asker | |
| 4,492,310 A | 1/1985 | Weingart | |
| 4,602,584 A | 7/1986 | North et al. | |
| 4,760,702 A | 8/1988 | Ammann et al. | |
| 4,795,312 A | 1/1989 | Purcaru | |
| 4,870,558 A | 9/1989 | Luce | |
| 5,123,372 A * | 6/1992 | Kobayashi et al. | 114/362 |
| 5,616,056 A | 4/1997 | Meissner | |
| 5,915,328 A * | 6/1999 | Rowan | 114/362 |
| 6,302,652 B1 | 10/2001 | Roberts | |
| 6,526,614 B2 * | 3/2003 | Anderson et al. | 14/69.5 |
| 6,644,926 B1 | 11/2003 | Vandyke | |
| 6,848,382 B1 | 2/2005 | Bekker | |
| 7,103,935 B2 * | 9/2006 | Hill | 14/71.3 |
| 7,228,582 B1 * | 6/2007 | Jones et al. | 14/71.1 |
| 8,671,869 B2 * | 3/2014 | Muller | 114/362 |
| 2009/0311924 A1 | 12/2009 | Wobben | |

FOREIGN PATENT DOCUMENTS

| | | | |
|---|---|---|---|
| CN | 87209395 U | 2/1988 | |
| DE | 422057 | 11/1925 | |
| DE | 2430630 A1 | 4/1976 | |
| DE | 139 351 A1 | 12/1979 | |
| DE | 243251 A1 | 2/1987 | |
| DE | 4101238 A1 | 7/1992 | |
| DE | 19952460 A1 | 5/2001 | |
| DE | 10102740 A1 | 8/2002 | |
| DE | 20 2010 004 794 U1 | 9/2010 | |
| GB | 1027763 | 4/1966 | |
| GB | 2 037 355 A | 7/1980 | |
| GB | 2037355 A * | 7/1980 | B63B 27/14 |
| GB | 2072112 A | 9/1981 | |
| GB | 2111007 A | 6/1983 | |
| JP | 50-155789 | 12/1975 | |
| JP | 51-122296 | 10/1976 | |
| JP | 53-110696 U | 9/1978 | |
| JP | 57-18596 A | 1/1982 | |
| JP | 57-33082 A | 2/1982 | |
| JP | 57-55292 A | 4/1982 | |
| JP | 58-87698 U | 6/1983 | |
| JP | 59-38190 A | 3/1984 | |
| JP | 59-125500 U | 8/1984 | |
| JP | 59-206296 A | 11/1984 | |
| JP | 60-38290 A | 2/1985 | |
| JP | 60-95398 U | 6/1985 | |
| JP | 60-139593 A | 7/1985 | |
| JP | 61-113090 U | 7/1986 | |
| JP | 61-169796 U | 10/1986 | |
| JP | 62-120097 | 7/1987 | |
| JP | 62-120097 U | 7/1987 | |
| JP | 62-129387 U | 8/1987 | |
| JP | 62-231889 A | 10/1987 | |
| JP | 63-98899 U | 6/1988 | |
| JP | 63-195998 U | 12/1988 | |
| JP | 4-331694 A | 11/1992 | |
| JP | 5-213271 A | 8/1993 | |
| JP | 8-26186 A | 1/1996 | |
| JP | 2000-262082 A | 9/2000 | |
| JP | 2001-30979 A | 2/2001 | |
| JP | 2003-138836 A | 5/2003 | |
| KR | 10-1993-0004152 A | 3/1993 | |
| KR | 10-2004-0096851 A | 11/2004 | |

OTHER PUBLICATIONS

Beverley, J.A., *Marine Engineering*, The Society of Naval Architects and Marine Engineers, Jersey City, N.J., 1991, Chapter VIII, "Electric Propulsion Drives," pp. 304-305, 3 pages.

Wagner, Claus Dieter, *Die Segelmaschine*, Ernst Kabel Verlag GmbH, Hamburg, 1991, pp. 154-175, 11 pages.

* cited by examiner

SHIP AND GANGWAY FOR THE SAME

BACKGROUND

1. Technical Field

The present invention concerns a ship, in particular a cargo ship, having an outside wall and a gangway for going on to and leaving the ship, the gangway being moveable between a lying position and a travel position.

2. Description of the Related Art

Ships of the kind indicated in the opening part of this specification usually constantly carry a gangway for going on to and leaving the ship. In particular ships for transporting people such as for example cruise ships are frequently boarded by way of passenger walkways which are fixedly arranged in the port and have a movable portion which can be maneuvered in height and width to an exit opening or a ship's deck. A similar principle is also to be found on airports. In contrast to such ships other ships, for example cargo ships, frequently dock in ports which do not have such arrangements available. In those cases the passenger walkways carried on the ship are used. Known passenger walkways are usually fixed on the ship's deck and after berthing are swung out laterally and let down from the ship. Other known ships have passenger walkways which are arranged on the ship in always the same position and which after berthing are merely lowered to the quay.

While the ship is moving the known passenger walkways suffer from the disadvantage that, by virtue of their arrangement, they interfere with the operational procedures on board the ship or cause increased fuel consumption by the ship by an increase in air resistance.

BRIEF SUMMARY

One or more embodiments of the invention provide a ship having a gangway, wherein the gangway has a floor having a lower surface which, in the travel position of the gangway, goes continuously into, such as align with, the surface of the outside wall of the ship. The air resistance of the ship is reduced in proportion to a reduction in the wind attack surface offered by the gangway. In addition the gangway generally does not have to be walked upon while the ship is moving and also otherwise does not perform any function. Because the gangway in the travel position with the lower surface of its floor provides a continuous transition to the outside wall, air resistance is minimized, which makes itself felt in a reduced fuel consumption.

The continuous transition between the lower surface of the floor of the gangway and the outside wall of the ship is preferably kink-free and particularly preferably is flat.

An advantageous development of the invention provides that the gangway in the travel position is accommodated within a recess in the outside wall. Accommodating the gangway in the recess makes it possible to provide that the gangway is arranged in a completely concealed relationship in the travel position.

Preferably the lower surface of the gangway is a closed surface and is adapted to completely close the recess in the travel position. Complete closure of the recess advantageously provides that air can flow substantially laminarly and without additional eddy formation past the recess. That has a further advantageous effect on the air resistance of the ship.

The gangway is preferably pivotable about a first axis from the lying position into the travel position. That provides that in the travel position the gangway is arranged substantially parallel to the outside wall, preferably vertically. The depth of the recess and the space thus required for the gangway can be minimized in that fashion. In an alternative configuration the gangway can also be pushed into the recess in parallel relationship.

Preferably the gangway is pivotable about a second axis from the lying position into a lowered position. The lowering movement by means of pivotal motion is preferably effected steplessly so that the height difference between the upper end of the gangway and the quay can be reliably bridged over, independently of the height of the quay wall and independently of the loading condition of the ship.

The gangway is preferably laterally pivotable in the lying position about a third axis. Pivotability about a vertical third axis ensures the possible option of pivoting the gangway laterally away from the outside wall of the ship in the lowered or unlowered condition, for example to bridge over lateral spacings occurring between the outside wall of the ship and the quay wall.

In a further advantageous configuration the ship has at least one crane for pivoting the gangway about the first and/or second and/or a third axis, which is reciprocatable between a lying position and a travel position. In the travel position the crane is preferably arranged within a recess in the outside wall of the ship, which at least partially coinciding with the recess that accommodates the gangway. Thus in the travel position the crane also does not represent any additional attack surface for air flowing around the ship, but is preferably also arranged in completely concealed relationship in the travel position.

Preferably therefore the recess accommodating the crane is completely closed in the travel position by the lower surface of the gangway.

In a further advantageous development the crane is arranged pivotably about an axis from the lying position into the travel position, wherein the gangway is moveable by means of the pivotal movement of the crane between the lying position and the travel position. The axis about which the crane is arranged pivotably is preferably oriented parallel to the first axis of the gangway. Particularly preferably the crane axis is oriented in coaxial relationship with the first axis of the gangway.

Preferably the crane has a winch for hauling in or letting out a cable. The cable is preferably connected to the gangway to cause the pivotal movement of the gangway about the second axis of the gangway, whereby the gangway is pivoted from the lying position into a lowered position or is lifted out of that position.

Further preferably the crane is provided with a jib which is telescopically extendable. The telescopically extendable jib is adapted to cause the pivotal movement of the gangway about the third axis of the gangway. In that way the lateral spacing or the lateral angle of the gangway in the lying position relative to the outside wall of the ship is altered.

In a further preferred embodiment of the ship according to the invention the gangway has at the left and/or right a railing which in the travel position is arranged within the recess for accommodating the gangway. Particularly preferably the railing is put up by means of a cable tackle or a hinged connection in the movement of the gangway from the travel position into the lying position. The railing is preferably foldable and in the travel position is arranged substantially parallel to the floor of the gangway.

In a further alternative embodiment of the ship according to the invention the gangway is telescopic. For that purpose the floor of the gangway preferably has a plurality of floor elements which are arranged telescopically slidably into each other. The floor elements can be compressed to a minimum length in the travel position and in the lying position can be extended to a length greater than the minimum length and are arranged substantially parallel to each other. As an alternative thereto the various floor elements are arranged foldably relative to each other by means of hinges and can be folded apart in the lying position like a folding ladder. The advantage of a telescopic structure is that the spatial extent of the recess, in particular in the longitudinal direction of the gangway, can be minimized in that structure. It is considered to be advantageous to provide a recess of the smallest possible volume to be able to make optimum use of the usable space on board the ship.

In a particularly preferred embodiment the ship according to the invention has at least one Magnus rotor. Magnus rotors are also referred to as Flettner rotors or sailing rotors.

The advantages of the gangway provided in accordance with the invention on the ship apply to an increased degree in relation to a ship having at least one Magnus rotor. The at least one Magnus rotor on the ship, in dependence on the air flowing therearound, generates a forward propulsion force which contributes to driving the ship and which in turn affords a significant fuel saving. Preferably the Magnus rotor is in the form of a cylinder. For optimized forward propulsion of the Magnus rotor it is of substantial significance to achieve an optimum flow around the Magnus rotor. For that purpose the ship is preferably optimized aerodynamically above the construction water line to avoid as far as possible wake eddies and other turbulence phenomena. Because, in addition to the conventional aerodynamic optimization measures such as for example smooth surfaces and gentle edge transitions, according to the invention the gangway is also preferably completely concealed in the travel position and particularly preferably also the crane controlling the gangway is completely concealed in the travel position, that promotes an afflux flow to the Magnus rotor, which comes close to the laminar flow field. That permits an ideal wind yield, which in turn contributes to a fuel consumption which is reduced to the maximum extent.

In a further advantageous embodiment provided in an end portion of the recess is a passage to the ship's interior or a ship's deck. The passage which preferably has a door is additionally closed in the travel position when the recess in turn is closed by the lower closed surface of the gangway. Further advantageously it is possible to gain access to the recess by means of the passage, for example to carry out maintenance and/or cleaning operations.

The gangway further preferably has steps. The steps are preferably of a parallelogram-like configuration. The parallelogram-like configuration of the steps is particularly advantageously such that the steps in the travel position and in the unlowered condition of the gangway in the lying position are arranged flat one beside the other. That minimizes the space required for a gangway formed with steps.

The ship preferably has securing elements in the form of latching hooks or magnets which are adapted to hold the railing and/or the gangway in the travel position. The advantage deriving therefrom is that the railing and/or the gangway are secured against unintentional loosening, which can lead to the production of noise or even damage.

The invention further concerns a gangway for going on to and leaving a ship. The gangway is designed for use on a ship according to a preferred embodiment of the present invention.

The term outside wall is used to denote that part of a wall structure of the ship's hull which is arranged above the construction waterline of the ship, also including any side walls of ship superstructure.

BRIEF DESCRIPTION OF THE SEVERAL VIEWS OF THE DRAWINGS

The invention is described in greater detail hereinafter by means of preferred embodiments and with reference to the accompanying Figures in which.

DETAILED DESCRIPTION

Figure 1:
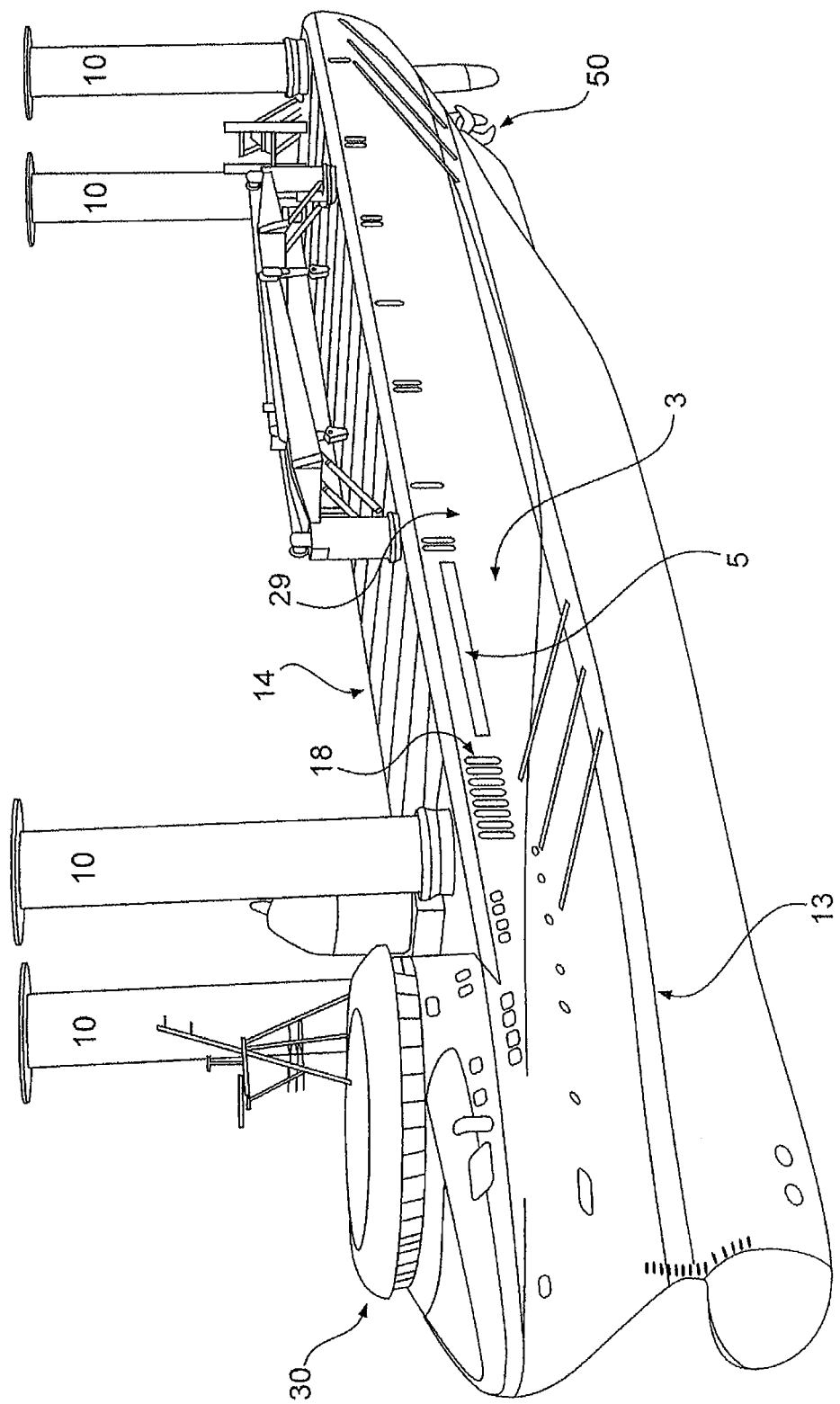
FIG. 1 shows a perspective view of a ship in a preferred embodiment.

FIG. 1 shows a diagrammatic view of a ship in accordance with a first embodiment. The ship has a hull comprising an underwater region 16 and an above-water region. The ship also has four Magnus rotors or Flettner rotors 10 arranged at the four corners of the hull. The ship has a bridge 30 in the forecastle. In addition under water the ship has a propeller 50. For improved maneuverability the ship can also have transverse thruster rudders, wherein preferably one is provided at the stern and one to two transverse thruster rudders are provided at the bow. Preferably those transverse thruster rudders are electrically driven. The bridge 30 and all superstructures are of an aerodynamic shape above the weather deck 40 to reduce the air or wind resistance. That is achieved in particular by substantially avoiding sharp edges and sharp-edged structures. To minimize the wind resistance as few superstructures as possible are provided.

The ship in the embodiment of FIG. 1 represents in particular a cargo ship designed especially for transporting wind power installations and components thereof. Transport of wind power installations and their corresponding components can be only limitedly implemented with commercially usual container ships as the components of a wind power installation represent a corresponding need for space which does not correspond to the commercially usual container dimensions while the masses of individual components are low, in comparison with the space they need. By way of example mention may be made here of rotor blades or pod casings of wind power installations which are predominantly in the form of bulky GRP structures weighing a few metric tons.

In this case the four Magnus rotors 10 represent wind-operated drives for the ship according to the invention. It is intended that the ship is basically driven with the Magnus rotors and the propeller or the main drive is used only for supplementing same under inadequate wind conditions.

In this case the four Magnus rotors 10 represent wind-operated drives for the ship according to the invention. It is intended that the ship is basically driven with the Magnus rotors and the propeller or the main drive is used only for supplementing same under inadequate wind conditions.

The configuration of the hull of the ship is such that the stern projects as far as possible out of the water. That means on the one hand the height of the stern above the water level but on the other hand also the length of the stern portion which is also suspended above the surface of the water. That configuration serves to detach the water from the hull at an early time in order to avoid a wave which travels along behind the ship as that leads to a high level of resistance in respect of the hull because that wave caused by the ship is also produced by the machine output power which then however is no longer available to provide forward propulsion.

The bow of the ship is cut off sharply over a relatively long distance. The bottom of the ship, up to a height of about 3 meters above the construction water line 13, is of a configuration that is optimized in respect of resistance, in regard to hydrodynamic aspects.

Thus the hull of the ship is not designed for maximum load carrying capacity but for minimum resistance (aerodynamic and hydrodynamic).

The superstructures of the ship are of an aerodynamic configuration. That is achieved in particular by all surfaces being in the form of smooth surfaces. The design configuration of the bridge 30 is intended to avoid in particular trailing wake eddies so that actuation of the Magnus rotors can be effected with as little disturbance as possible. The bridge is preferably arranged at the bow of the ship. Arranging the superstructures in the middle of the ship is also possible but would unnecessarily impede loading or discharge of the load as the superstructures would thus be arranged precisely over the middle of the hold.

As an alternative thereto the bridge 30 can be arranged at the stern of the ship, that however would be found to be disadvantageous insofar as the Magnus rotors would adversely affect a clear view forwardly.

The drive or propulsion of the ship is optimized for a wind drive so that the ship of the present invention is a sailing ship.

The Magnus rotors are preferably arranged in the region of the corner points of the holds so that they define a rectangular area. It should however be pointed out that another arrangement is also possible. The arrangement of the Magnus rotors is based on a notion that a given rotor area is required to achieve the desired drive power by the Magnus rotors. The dimensions of the individual Magnus rotors are reduced by distributing that required surface area to a total of four Magnus rotors. That arrangement of the Magnus rotors provides that a continuous area which is as large as possible remains free, which serves in particular for loading and unloading the ship and makes it possible to carry a deck load in the form of a plurality of container loads.

The weather deck 14 has light ports 18 which can be covered with transparent material to afford protection from weather influences or seawater. The shape of the covers corresponds in that respect to that of the other parts of the hull.

A recess 5 is arranged in a lateral region of the above-water region of the ship's hull, which is associated with an outside wall 29. The recess 5 is in a gangway portion. The recess 5 is closed and a gangway is completely accommodated in the recess 5.

Figure 2:
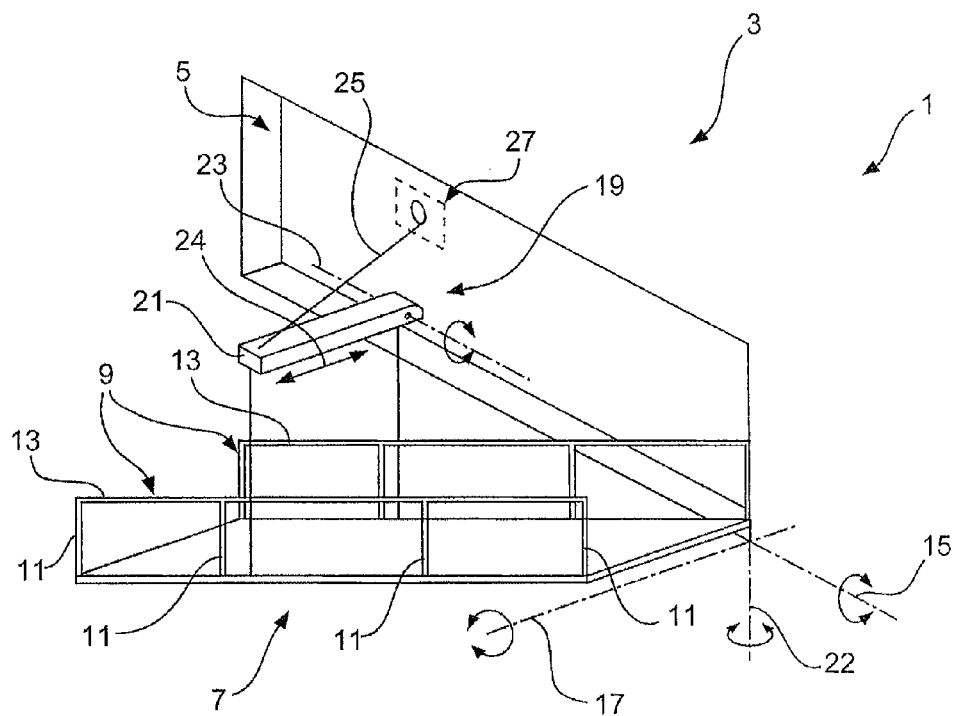
FIG. 2 shows a perspective view of a gangway according to the invention arranged on a ship according to the invention as shown in FIG. 1.

FIG. 2 shows the recess 5 of FIG. 1 in the opened condition. A gangway 7 is arranged in the gangway portion 3 of the ship 1. In the position shown in FIG. 2 the gangway 7 is arranged in a lying position and lowered. The gangway 7 has a respective railing 9 towards the left and the right. The railing has in each case a plurality of struts 11 and a hand rail 13.

In the illustrated orientation the gangway 7 is pivoted about a first axis 15 from a travel position into the lying position. The gangway 7 is also pivoted about a second axis 17 whereby the gangway 7 is moved into a lowered position. In addition arranged within the recess 5 is a crane 19 which as shown in FIG. 2 is arranged in a lying position and partially extends out of the recess 5. The crane 19 has a jib 21 arranged pivotably about a crane axis 23. As shown in FIG. 2 the crane axis 23 is oriented parallel to the first axis 15 of the gangway. A cable 25 which passes around the gangway 7 by means of direction-changing means (not shown) is guided by means of the jib 21 of the crane 19. The cable 25 is deflected by a symbolically illustrated cable winch 27. The winch 27 is arranged completely within the recess 5. The jib 21 of the crane 19 is telescopically extendable in the direction of the arrow 24. The gangway 7 is pivotable about a third axis 22. The third axis 22 is oriented vertically. The crane 19 is adapted to move the cable 25 with a translatory movement by means of the extension movement of the jib 21 in the direction of the arrow 24. As a consequence of the translatory movement of the cable 25 the gangway 7 is adapted to fully perform a pivotal movement about the third axis 22.

Figure 3:
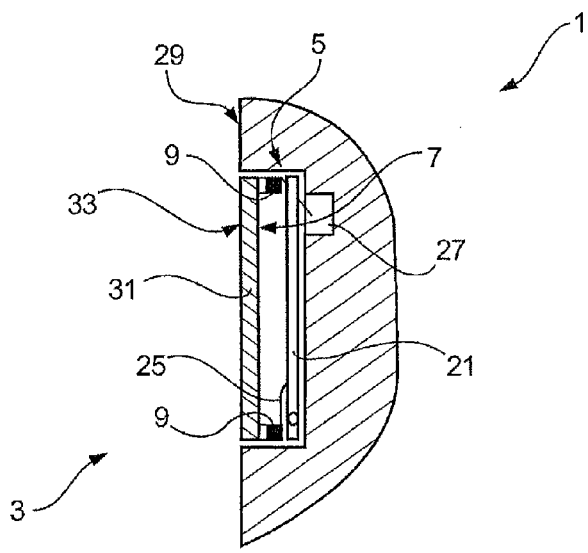
FIG. 3 shows a cross-sectional view of a region of the ship of FIG. 1 and the gangway of FIG. 2.
Figure 6:
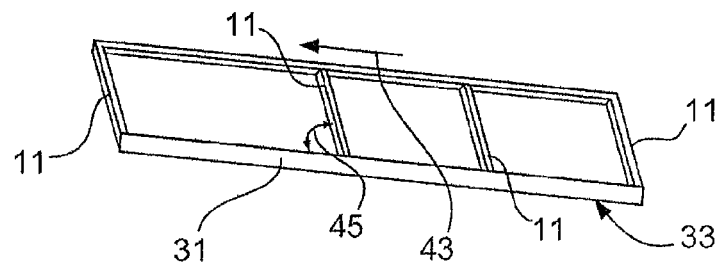
FIG. 6 shows a side view of the gangway of FIG. 5.
Figure 7:
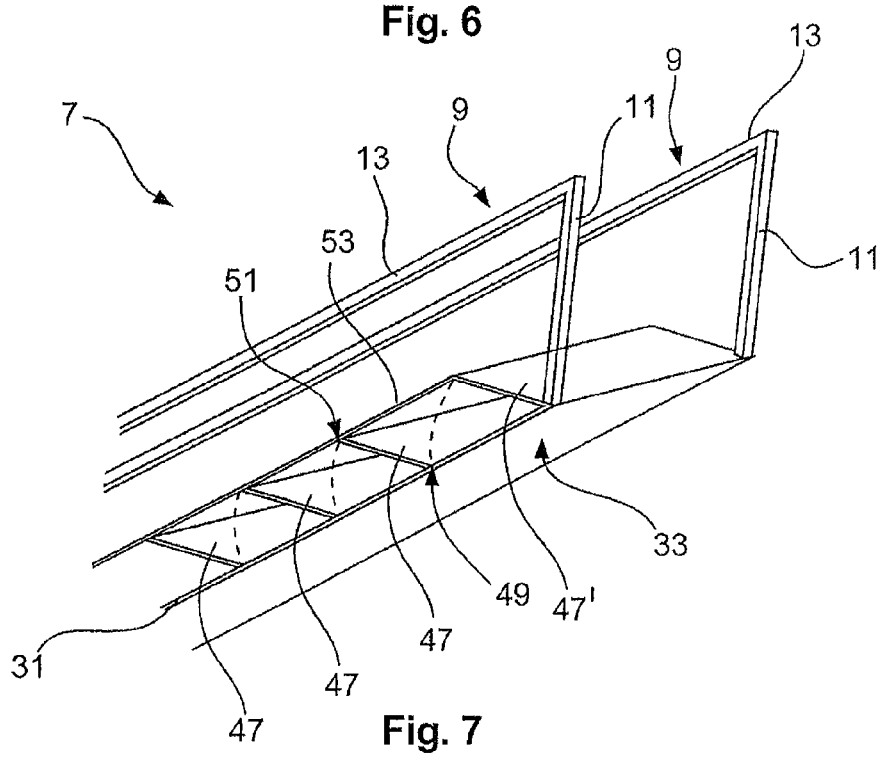
FIG. 7 shows a diagrammatic perspective view of a gangway in accordance with a further preferred embodiment.

FIG. 3 shows a cross-sectional view substantially of the gangway portion 3 of the ship 1. In the gangway portion 3 of the ship 1, the recess 5 in the outside wall 9 is closed completely by a floor 31 of the gangway 7. At the underside of the floor 31 the gangway 7 has a lower surface 33 which goes substantially flat into the outside wall 29 of the ship 1. The transition between the lower surface 33 of the floor 31 and the outside wall 29 is admittedly not completely gap-free and is thus not continuous in a mathematical sense, but is designed to be kink-free and step-free having regard to production tolerances which are usual in ship building. The gangway 7 is thus completely accommodated in the interior of the recess 5. The gangway 7 is disposed in a vertical orientation and is arranged in the travel position. The railings 9 arranged at each of the two sides is folded together in the travel position. Alternative possible ways of displacing the railing 9 are shown in FIGS. 6 and 7. The jib 21 of the crane 19 is also oriented vertically in FIG. 3 and is pivoted upwardly in the travel direction. The cable 25 is wound up suitably far by means of the winch 27 to hold the crane 19 and the gangway 7 in the travel position. Optional additional securing elements are not shown in FIG. 3 but can be provided in the illustrated orientation of the gangway 7.

Figure 4:
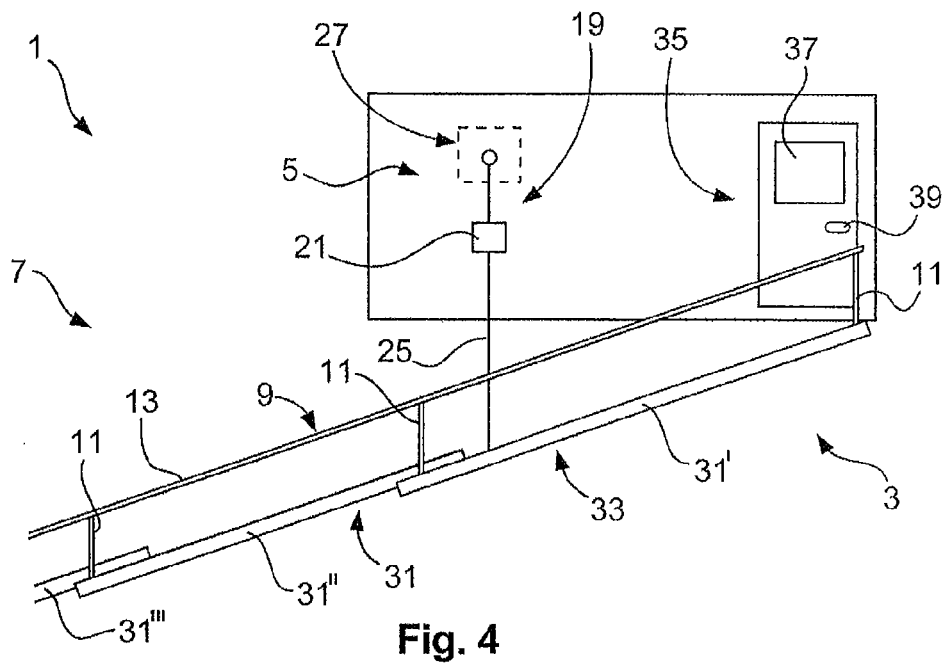
FIG. 4 shows a side view of a gangway according to the invention on a ship according to the invention in an alternative embodiment.

A further advantageous embodiment of a gangway 7 according to the invention on a ship 1 is shown in FIG. 4. The gangway 7 associated with the recess 5 of the ship is pivoted out in the lying position and lowered. Besides the jib 21 of the crane 19 the winch 27 for hauling in and letting out the cable 25, as well as a door 35, are arranged within the recess 5. The door 35 has a viewing window 37 and a door handle 39. Alternatively instead of the door 35 there can also be a passage.

The gangway itself has a floor 31 comprising a plurality of floor elements 31', 31" and 31''' which are fitted telescopically into each other. The floor elements 31', 31", 31''' are displaceable relative to each other in the longitudinal direction of the gangway 7, optionally by means of a hydraulic, pneumatic or electrical drive. Associated with each of the floor elements 31', 31", 31''' are one or more struts 11, on which the respective hand rail 13 is supported on one side of the railing. The rail 13 as shown in FIG. 4 is designed to be adapted to the change in length of the gangway 7, due to the displacement of the floor elements 31', 31", 31'''. For example the hand rail 13 can be for that purpose in the form of a cable. Alternatively the hand rail can also comprise a plurality of individual segments each associated with the respective floor element 31', 31", 31'''.

The floor elements 31', 31", 31''' are accommodated completely in the recess 5 within the outside wall 29 in the condition of being pushed together to their maximum, together with the other components of the gangway 7.

Figure 5:
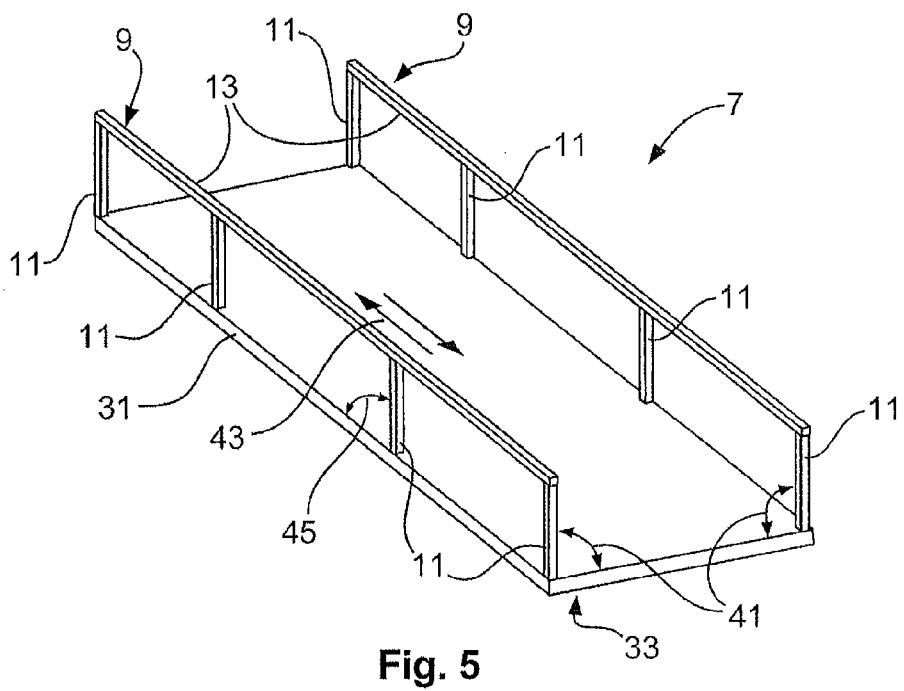
FIG. 5 shows a diagrammatic perspective view of a gangway in accordance with a further advantageous embodiment.

Other possible forms of displaceability of the railing 9 are shown in FIGS. 5 and 6. FIG. 5 diagrammatically shows a gangway 7 with railings 9 arranged at both sides. The railing 9 has a plurality of pivotable struts 11 respectively connected to a hand rail 13 on each side. FIG. 5 shows by way of example two alternative possible ways of pivotably moving the railing. In accordance with a first option the railing 9 is adapted to be pivotable inwardly in the direction of the arrow 41 between a substantially perpendicular position in comparison with the floor 31 of the gangway 7 and a substantially parallel orientation with respect to the floor 31 of the gangway 7. In an alternative embodiment the railing 9 is adapted to be pivotable parallelogram-like by movement of the hand rail 13 in the direction of the arrow 43. Due to the parallelogram-like pivotal movement the angle 45 between the struts 11 and the floor 31 (or the lower surface 33) of the gangway 7 changes from a substantially perpendicular position of the struts 11 to a substantially parallel orientation of the struts 11, in each case with respect to the floor 31 of the gangway 7.

FIG. 6 shows a parallelogram-like displacement of the railing 9, as described hereinbefore.

Figure 8:
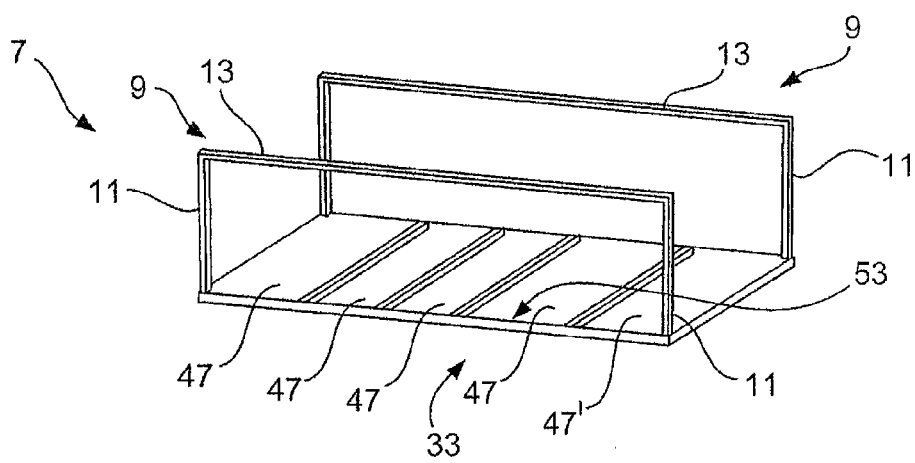
FIG. 8 shows a perspective view of the gangway of FIG. 7 in an alternative operating condition.

A further preferred embodiment of the gangway 7 according to the invention is shown in FIGS. 7 and 8. The gangway 7 shown in these Figures has a plurality of steps 47. The steps 47 are adapted to be pivotable parallel relative to the lower surface 33 or the floor 31 of the gangway 7. The steps 47 are connected to the floor 31 in a first portion 49 and connected to each other by means of a connecting member 53 in a second portion 51.

The position of the gangway 7 shown in FIG. 7 corresponds to the lowered lying position. The uppermost step 47' is fixed in a horizontal position either by means of the connected struts 11 or by means of an additional holding element (not shown). By virtue of the steps 47 being connected together by means of the connecting member 53 all other steps are also held in the horizontal position.

As can be seen from a comparison of FIGS. 7 and 8, by raising the gangway 7 out of the lowered lying position into the lying position, the steps 47 can be moved into covering relationship with the floor 31 or the lower surface 33 of the floor 31. That makes it possible to implement the provision of steps on the gangway 7 in space-saving fashion.

Alternatively it is also possible for the individual steps 41 each to be provided with a respective strut 11 and for the horizontal position of the steps 47 to be ensured by means of a rigid hand rail 13 which interconnects the struts 11 of the railing 9. For that purpose it is only necessary to ensure a vertical position of one of the struts 11 at one location, for example by holding elements.

Figure 9:
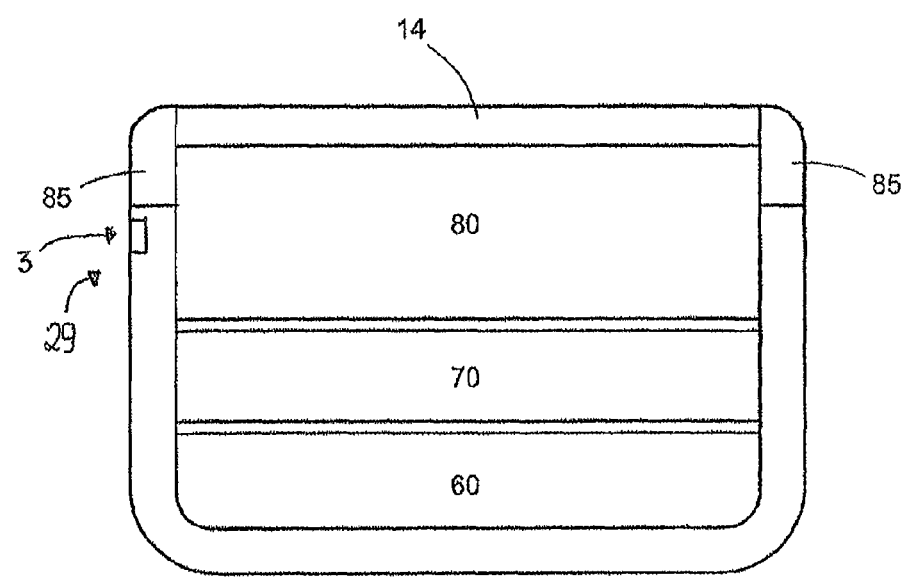
FIG. 9 shows a view in section in the transverse direction through the ship.

FIG. 9 shows a sectional view of the ship. In this case a lower space 60 is arranged as the lowermost hold. Arranged above the lower space 60 is a first intermediate deck 70 and a second intermediate deck 80. The second intermediate deck 80 is closed off by the weather deck 14. An operational passage or main deck 85 is provided at the sides of the weather deck 14.

The hatch coaming of the loading hatches and the main deck 85 are provided over their entire length with a cover so that a surface is formed having a surface adapted to the outer shell of the ship. The transition is preferably continuous, particularly preferably being kink-free.

The configuration of the cover of the main deck 85 means that the top side of the hull of the ship is of an aerodynamic configuration as there are no superstructures which could cause turbulence in the air flow. That is also the reason for covering the main deck 85 as far as the outer shell of the ship so as to provide a passage on the main deck 85, which is weather-protected and aerodynamically faired.

The configuration of the weather deck or the cover on the main deck 85 provides that the main deck 85 is also protected from unfavorable weather conditions, apart from the aerodynamically favorable shape.

In addition FIG. 9 shows the arrangement of the gangway portion 3 at the outside wall 29 of the ship. Both the gangway portion 3 and also the cover of the main deck 85 pass substantially flat into the outside wall of the ship. That ensures that the occurrence of turbulence is minimized in regard to wind which at least partially laterally flows against the ship. In a ship preferably equipped with one or more Magnus rotors the air flow is guided in the best possible fashion in the direction of the rotors.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cargo ship comprising:
    an outside hull having a first recess; and
    a gangway for going on to and leaving the ship, the gangway being reciprocatable between a loading position and a stored position, the gangway including a floor having a lower surface, wherein in the stored position the gangway is configured to be located within the first recess in the outside hull, the lower surface of the floor of the gangway aligning with a surface of the outside hull, wherein the lower surface of the gangway is a closed surface and is configured to completely close the first recess when the gangway is in the stored position, so that the air can flow substantially laminarly and without additional eddy formation past the recess.

2. The ship according to claim 1 wherein the gangway is pivotable about one or more of:
    a first axis from the loading position into the stored position; and
    a second axis from the loading position into a lowered position.

3. The ship according to claim 1 further comprising a crane for moving the gangway about at least one of the first axis, the second axis, and the third axis, the crane being moveable between a loading position and a stored position.

4. The ship according to claim 3 wherein the crane is configured to be located within a second recess in the outside hull of the ship when the crane is in the stored position, the second recess being at least partially coincidental with the first recess.

5. The ship according to claim 4 wherein the second recess is completely closed by the lower surface of the gangway when the crane is in the stored position.

6. The ship according to claim 4 wherein the crane is configured to pivot about an axis from the loading position into the stored position, and the gangway is moved between the loading position and the stored position by the pivotal movement of the crane.

7. The ship according to claim 3 wherein the crane has a telescopically extendable jib configured to pivot the gangway about the third axis.

8. The ship according to claim 1 wherein the gangway further comprises a railing, the railing being receivable in, the first recess, when the gangway is in the stored position.

9. The ship according to claim 6 wherein in the stored position the railing is substantially parallel to the floor of the gangway.

10. The ship according to claim 1 wherein the gangway is telescopic and comprises a plurality of floor elements that form the floor of the gangway.

11. The ship according to claim 1 further comprising a Magnus rotor.

12. A gangway for going on to and leaving a ship, the gangway comprising:
an upper surface and a lower surface, the gangway being moveable between a loading position and a stored position, wherein in the stored position the gangway is configured to be located within a recess in an outside hull of a ship, the lower surface of the gangway aligning with the outside hull of the ship and closing the recess when in the stored position so that air can flow substantially laminarly and without additional eddy formation past the recess.

13. A ship having:
a hull with an inner surface and an outer surface, the outer surface of the hull having a recess formed therein, the recess being delimited by back and side surfaces; and
a gangway having an outer surface and an inner surface, the gangway being rotatably connected to the hull, and moveable between a stored position in which the gangway is located in the recess such that the inner surface of the gangway is proximate the back surface of the recess and the outer surface of the gangway is substantially parallel to the outer surface of the hull, and a loading position in which the inner surface extends from a deck of the ship.

14. The ship according to claim 13 further comprising a crane for moving the gangway between the stored position and the loading position.

15. The ship according to claim 14 wherein the crane is located in the recess in the outside surface of the hull of the ship when the gangway is in the stored position.

16. The ship according to claim 15 wherein the crane includes a jib that is connected to the gangway and is pivotable about an axis that is parallel to a longitudinal axis of the recess.

17. The ship according to claim 15 wherein the gangway includes railings that each extend along sides of the inner surface.

* * * * *